Figure 1:
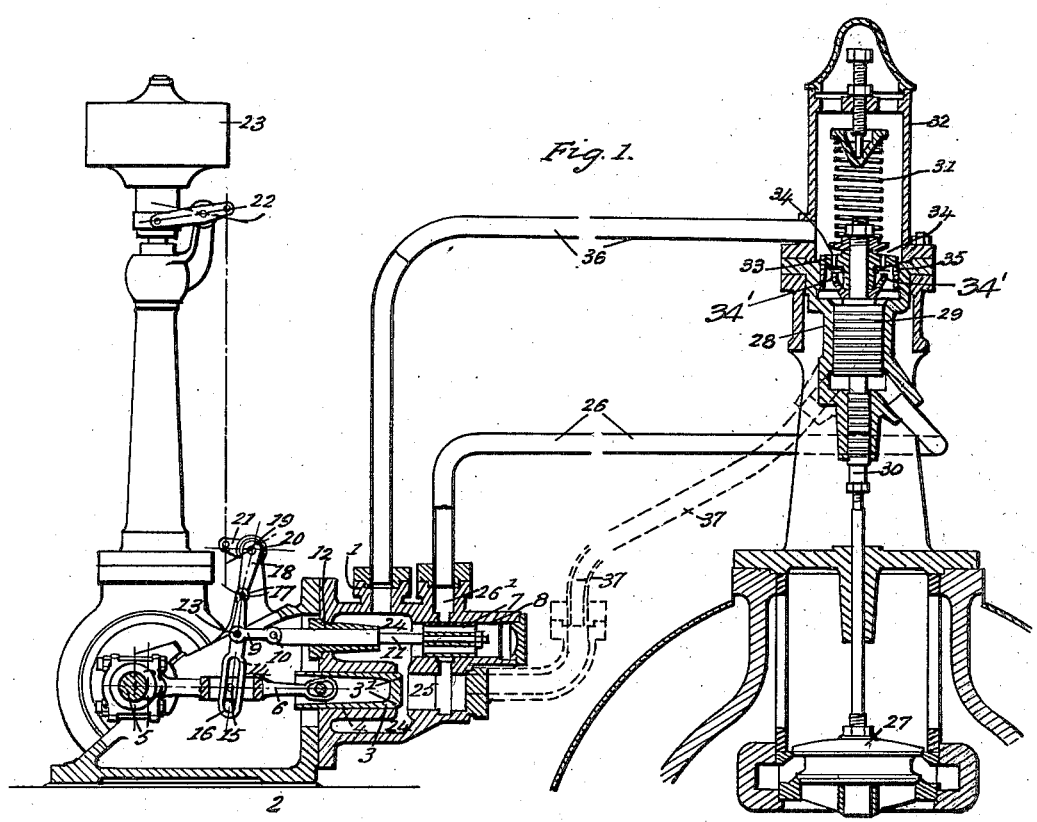

Jan. 23, 1923.

H. PILLING.
OPERATION OF VALVES BY FLUID PRESSURE.
FILED SEPT. 8, 1920.

1,443,239.

6 SHEETS—SHEET 1.

Inventor
Henry Pilling
By
Attorney

Jan. 23, 1923.
H. PILLING.
OPERATION OF VALVES BY FLUID PRESSURE.
FILED SEPT. 8, 1920.
1,443,239.
6 SHEETS—SHEET 2.
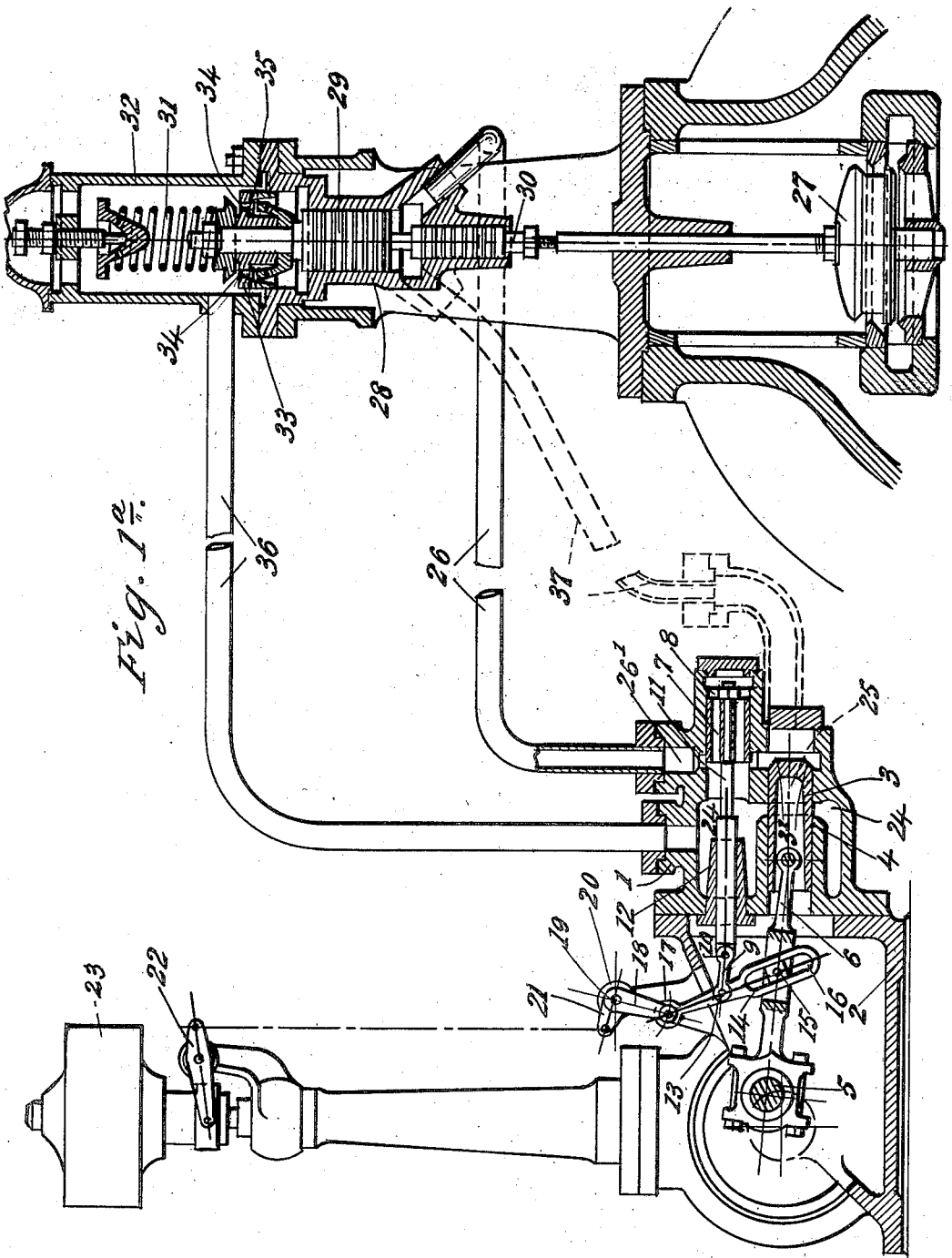

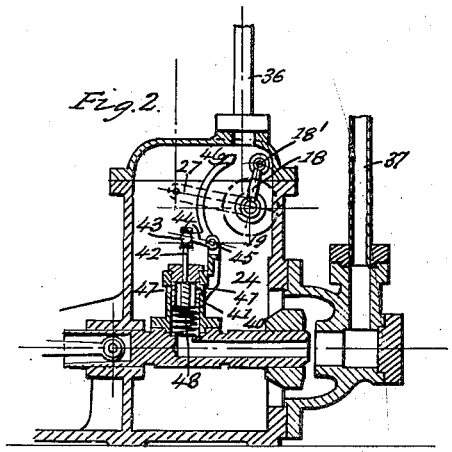
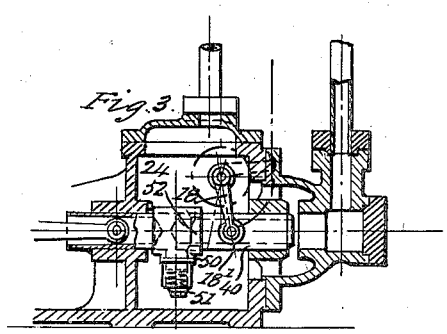
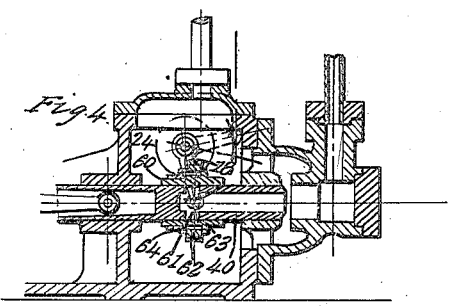

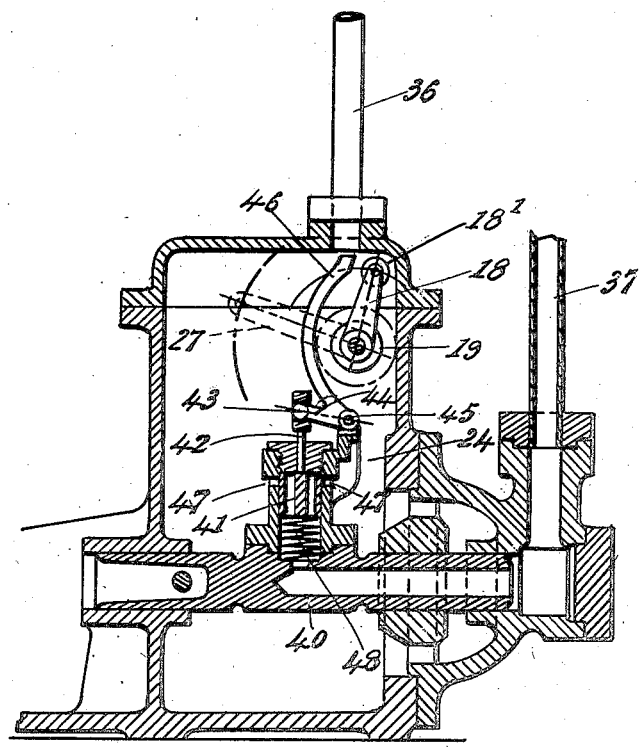

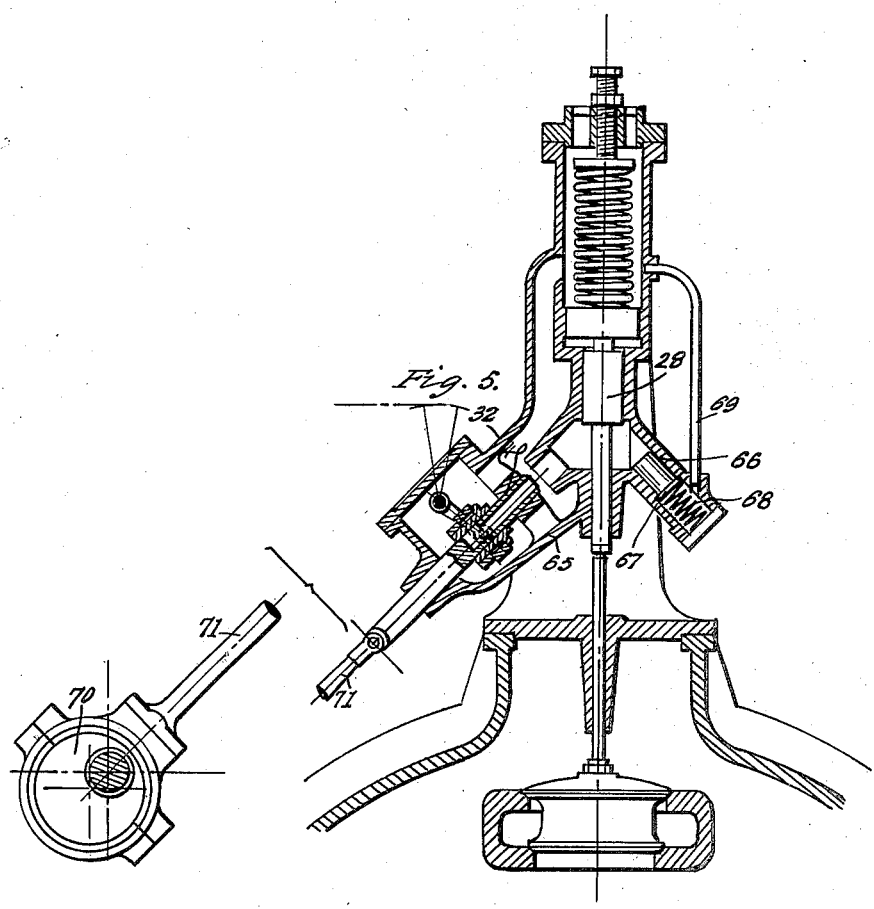

Jan. 23, 1923.

H. PILLING.
OPERATION OF VALVES BY FLUID PRESSURE.
FILED SEPT. 8, 1920.

1,443,239.

6 SHEETS—SHEET 6.

Inventor
Henry Pilling
By
Attorney

Patented Jan. 23, 1923.

1,443,239

UNITED STATES PATENT OFFICE.

HENRY PILLING, OF CHORLTON-CUM-HARDY, ENGLAND.

OPERATION OF VALVES BY FLUID PRESSURE.

Application filed September 8, 1920. Serial No. 409,001.

*To all whom it may concern:*

Be it known that I, HENRY PILLING, a subject of the King of Great Britain, residing in Chorlton-cum-Hardy, England, have invented certain new and useful Improvements in or Relating to the Operation of Valves by Fluid Pressure, of which the following is a specification.

The invention relates to the mechanism of valve gears employing the hydraulic principle of transmitting the forces required to operate the valves of gas, oil or steam engines and consists of improvements in this mechanism. Such valves may be inlet valves which usually open at a fixed point of the engine stroke and close according to the load or other working requirements under the influence of a governor or by hand adjustment. Or the valves, as in the case of uniflow steam engines, may be exhaust or compression release valves which require a variable duration of opening according to the compression to be obtained. This method has the advantage that the mechanism for producing the fluid pressure can be placed at any convenient position near the crank shaft and a pipe line of the required length can be used as the transmission means for operating the valve. With slow running engines a pipe of considerable length may be used without any practical disadvantages, but with fast running engines the inertia of a considerable column of liquid is liable to give rise to mechanical shock and objectionable noise.

For engines of this class more especially those, such as uniflow engines, in which the inlet valve is only open for a very short time, it is advisable to use small pumps with high pumping pressure and to reduce to the lowest dimensions the length of the pipe connection so that the minimum mass of liquid is set in motion at each pulsation.

One object of the invention is to be able to control the duration of the period during which the valve is open according to the load or other conditions, for example, an exhaust valve may be held open for a varied period or an inlet valve may be operated so as to give a fixed lead or point of opening and in addition a variable cut off or closure point.

Also, while the opening of the valve is effected by the pressure produced in the liquid by the force pump, the period during which the valve is open is determined by means which release the pressure at the required time.

According to the invention, the closing movement of the valve is effected by a spring or the like under the control of a dashpot or other retarding device acting independently of the liquid operating the valve. This arrangement enables the valve to be freed from the shocks otherwise accompanying the rapid pulsations of fluid pressure.

The accompanying drawings illustrate examples of the application of the method according to the invention.

Figure 6:
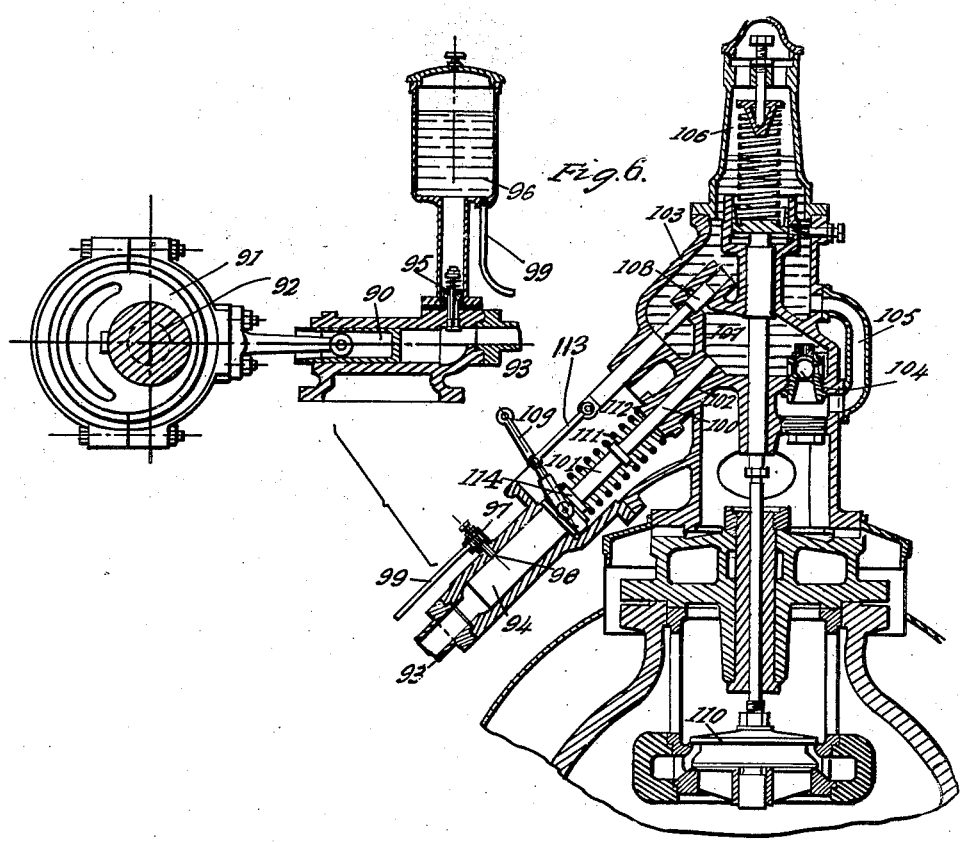

Fig. 1 represents in elevation mainly in section, means for operating the inlet valve of an engine through a comparatively long pipe line. Figs. 2, 3, and 4 show in section modifications of the release valve by which the cut off or closure point is adjusted. Fig. 5 shows arrangements adapted for quick running engines in which the pump mechanism is placed directly on the valve bonnet, so that the pipe line is suppressed. Fig. 6 shows an arrangement in which the plunger which actuates the valve is itself operated by a column of liquid set in motion by a plunger suitably driven from the engine. In Figs. 1–6 the parts are shown in the positions they assume shortly before the main valve begins to open. In Figs. 1ª and 2ª the parts are shown in the positions they assume when the main valve is fully open.

In the construction shewn in Fig. 1, 1 is a box secured to a frame 2, a plunger 3, being reciprocated in a barrel 4, forming part of the box 1, by means of a small crank 5, actuated by the main engine and connecting rod 6. A release valve 7, of the piston type is adapted to be reciprocated in a barrel 8, provided in the box 1, by a link 9, pivoted at 10 to the plunger rod 11, which is guided in a bush 12. The link 9 is pivoted at 13 to a slotted lever 14; a pin 15 secured to the connecting rod 6 and engaging in the slot 16 of the link 14 imparts a constant reciprocating motion to the release valve 7. The floating lever 14 is fulcrumed at 17 to a lever 18 mounted on a spindle 19, supported on bearings 20, another lever 21 secured to the spindle 19 being connected by suitable means to a lever 22, which is raised or lowered in known manner by a governor 23. Any alteration of the speed of the engine causes an angular displacement of the lever 18 and a corresponding movement of the link 9 and a change in the reciprocating movement of the piston valve 7 relatively to the plunger 3. It is obvious that the lever 18 may alternatively be moved by hand control instead of governor control.

The space 24 in the box 1, acts as a reservoir of oil and as soon as the plunger 3 enters the portion 25 of the cylinder 4 a pulse of fluid pressure is transmitted through a pipe 26 connecting the part 25 of the barrel with the valve mechanism. To avoid shock due to the sudden generation of momentum in the oil column the forward end of the plunger is tapered as shewn at 3'. The movement of the oil column is continued as the plunger 3 advances until the passage 26' is uncovered by the movement of the release valve 7 and the pipe 26 is thereby placed in communication with the reservoir 24. It is obvious that the time during which fluid pressure is applied to lift the valve depends upon the advance of the valve 7 relatively to the plunger 3 and this advance depends upon the angular position of the lever 18.

In the example shewn, a valve 27 is raised by the oil pressure transmitted through the pipe 26 and communicates with the bottom of a valve casing 28 in which a piston 29 is lifted by the oil pressure applied to its lower surface. The piston is suitably connected by a rod 30 to the stem of the valve 27. The valve is returned to its seating by a spring 31 contained in an extension 32 of the valve casing. A dashpot 33 of known construction damps the movements of the piston 29 as the valve closes.

For this purpose apertures 34 in the dashpot are open during the upward movement by valves 34', since the pressure of the liquid in the valve casing 32 is greater than the pressure below the dash pot 33, and closed during the downward movement since the pressure below is then greater than the pressure above the dashpot; in the latter case the liquid passes from below upward through apertures 35, the area of which is gradually reduced as the piston descends. A pipe 36 connected with the reservoir 24 provides a head of oil which ensures that the working parts are under all conditions full of oil.

In the arrangement described the oil undergoes a reciprocating motion in the pipe 26 but an alternative construction is shewn in dotted lines in Fig. 1, in which the oil is led to the casing 28 by an additional pipe 37 communicating with the part 25 of the barrel 4 and returns to the reservoir 24 by the pipe 26. The reciprocating movement of the oil in the single pipe is thus changed into a step by step movement always in the same direction, with the advantage that should any air be trapped in the pipes it will ultimately be discharged into the reservoirs.

In Fig. 1, the pump barrel is shewn as horizontal; it might, however, be in an inclined or vertical position.

In the construction shewn in Fig. 2, the plunger 40 is hollow and the release valve 41 is fitted in a valve chamber arranged round the plunger and moving with it. The head 43 of the stem 42 of the release valve 41 is operated by one arm 44 of a lever pivoted at 45; the other arm 46 of the lever acts as a tappet and in the forward movement of the valve chamber encounters the free end of the lever 18 secured as in Fig. 1 to the spindle 19 which is rotated by the lever 21 connected to the governor as described in connection with Fig. 1. The release valve 41 is moved, when the tappet 46 engages with a roller 18' at the end of the arm 18, so as to uncover ports 47 in the valve chamber and allows the oil in the hollow plunger 40 to return to the reservoir 24. The cut off is regulated by the change in the angular position of the arm 18. A spring 48 returns the release valve to its closed position.

In Fig. 3 the release valve is in the form of a sleeve 50 adapted to slide on the hollow plunger 40 but normally to move with it under the pressure exerted by a spring 51 of which one end bears against a cylindrical extension of the sleeve and the other end presses a curved plate into frictional engagement with the external surface of the plunger 40. When the forward end of the sleeve 50 engages with the roller 18' at the end of the arm 18, connected as in the previous Figs. to the governor device, the sleeve slides relatively to the plunger to uncover ports 52 provided in the hollow plunger and to allow the oil in the interior of the plunger free communication with the reservoir 24.

The time at which this release occurs obviously depends on the governing device.

In the construction shown in Fig. 4 the release valve 60 is also in the form of a sleeve surrounding the plunger 40 but the sleeve is fixed except as far as its position is adjusted by the governor. The oil in the hollow plunger 40 is placed in communication with the reservoir 24 when the forward movement of the plunger has uncovered a port 61 by passing the forward edge of the sleeve 60. The arm 18 connected to the governor is connected to a ring 62 which is held in position against a flange 63 of the sleeve 60 by a nut 64.

The construction shown in Fig. 5 is similar to that shown in Fig. 4 except that the pump plunger 40 is contained in an extension 65 of the casing 32, so that the pipe lines conveying the oil to and from the casing are omitted. This arrangement is preferable when it is necessary to reduce to a minimum the momentum of the moving column of liquid.

This construction shows also an extension 66 of the casing 32 in which a collared plug 67 is held against its seating by a spring 68. This plug moves outwards if an excessive momentary pressure, greater than that normally produced by the plunger arises from any cause; this momentary relief moderates the force of the blow imparted to the main valve. A pipe 69 serves to convey to the reservoir 24 any oil finding its way past the plug. In this construction the plunger is shown operated by means of an eccentric 70 fixed on the lay shaft of the engine and rod 71, the lead of the eccentric being fixed and its stroke constant.

In engines running at very high speed it may be desirable to replace the valveless pumps shown in the drawings by pumps provided with suction and delivery valves in which the rise of pressure commences at the beginning of the stroke of the plunger, and not as in the examples illustrated when part of the plunger stroke has been completed; by this modification the shock due to the acceleration of the liquid column may be still further reduced.

In the arrangement shown in Fig. 6, a plunger 90 is driven by an eccentric 91 secured to a shaft 92, which may be a lay shaft or the crank shaft of the engine. Liquid is forced by the plunger 90 to traverse a pipe 93 connecting the plunger 90 with a plunger 94 which through the medium of the liquid effects the opening of the valve.

A valve 95 opening inwardly against spring pressure into the casing of the plunger pump 90 connects this casing with an oil reservoir 96 and maintains the pipe full of oil.

A valve 97 provided in the barrel of the plunger 94 opens when a port 98 is uncovered by the plunger at the end of its return stroke and allows a small quantity of oil to be led to the reservoir 96 through a pipe 99 and with it any air that may have been trapped in the pipe 93.

A plunger 100 connected by a rod 101 with the plunger 94 reciprocates in a barrel 102 forming part of the casing 103 which contains the valve gear to be operated. A suction valve 104 communicating by means of a passage 105 with the oil reservoir 106 maintains a space 107 in the casing 103 full of oil during the return stroke of the plungers. A release valve 108 is operated, for example, by a link 113 pivoted to a lever 109, the upper end of which is connected by a pin 17, substantially as described in connection with Fig. 1, to one arm of a lever the other arm of which may be connected to the governor. The lower end of the lever 109 is pivoted to a collar on the plunger 94. The point of closure of the main valve 110 is controlled in dependence on the angular position of the pin 17.

A spring 111 surrounding the plunger rod 101 and plunger 100 is held between a flange 112 of the barrel 102 and a collar 114 on the plunger 94. This spring is compressed on the forward movement of the plungers and causes the return movement of the plungers and of the oil column in the pipe 93.

Having thus described the nature of the said invention and the best means I know of carrying the same into practical effect, I claim:—

1. In an engine a valve, a stem secured to said valve, a piston secured to said stem, a cylinder in which said piston works, a barrel connected to said cylinder, a plunger reciprocating in said barrel for forcing liquid under pressure into said cylinder, a release valve adapted to release the pressure in said cylinder and means for actuating said release valve to release the pressure at a predetermined part of the stroke of said plunger.

2. In an engine a valve, a stem secured to said valve, a piston secured to said stem, a cylinder in which said piston works, a barrel connected to said cylinder, a plunger reciprocating in said barrel for forcing liquid under pressure into said cylinder, a release valve adapted to release the pressure in said cylinder and an adjustable lever for actuating said release valve to release the pressure at different parts of the stroke of said plunger.

3. In an engine a valve, a stem secured to said valve, a piston secured to said stem, a cylinder in which said piston works, a barrel connected to said cylinder, a plunger working in said barrel for forcing liquid under pressure into said cylinder, a release valve adapted to release the pressure in said cylinder, a governor, a lever rotated by said governor and operating said release valve to release the pressure at different parts of the stroke of said plunger.

4. In an engine a valve, a stem secured to said valve, a piston secured to said stem, a cylinder in which said piston works, a barrel in communication with said cylinder, a plunger reciprocating in said barrel for forcing liquid under pressure into said cylinder, a release valve adapted to release the pressure in said cylinder, a liquid-containing casing connected to said cylinder, a spring controlled dashpot contained in said casing and connected to said valve stem, and means operating said valve to release the pressure at a predetermined part of the stroke of said plunger.

5. In an engine a valve, a stem secured to said valve, a piston secured to said stem, a cylinder in which said piston works, a barrel in communication with said cylinder, a plunger reciprocating in said barrel for forcing liquid under pressure into said cylinder, a valve for releasing the pressure in said cylinder, a liquid-containing casing connected to said cylinder, a spring actuated dashpot having apertures therein contained in said casing and connected to said valve stem, means for uncovering said apertures when said valve is opening and for closing said apertures when said valve is closing, and means operating the said release valve to release the pressure at a predetermined part of the stroke of said plunger.

6. In an engine a valve, a stem secured to said valve, a piston secured to said stem, a cylinder in which said piston works, a barrel communicating with said cylinder, a plunger working in said barrel for forcing liquid under pressure into said cylinder, a valve for releasing the pressure in said cylinder, a liquid containing casing connected to said cylinder, a liquid reservoir, means connecting said reservoir and said casing and a valve adapted to connect said cylinder with said reservoir at a predetermined part of the stroke of said plunger.

7. In an engine a valve, a stem secured to said valve, a piston secured to said stem, a cylinder in which said piston works, a barrel in communication with said cylinder, a plunger reciprocating in said barrel for forcing liquid under pressure into said cylinder, a second barrel and piston valve therein, a rod connected to said piston valve and means for reciprocating said piston valve, said means comprising a pivoted floating lever hinged to said rod and oscillated by said plunger, a reservoir for said liquid and a connection between said reservoir and said cylinder opened and closed by said piston valve.

8. In an engine a valve, a stem secured to said valve, a piston secured to said stem, a cylinder in which said piston works, a barrel communicating with said cylinder, a plunger working in said barrel for forcing liquid under pressure into said cylinder, a second barrel and piston valve therein, a rod connected to said piston valve, and means for reciprocating said piston valve, said means comprising a pivoted floating lever hinged to said rod and oscillated by said plunger, a spindle and bearings therefor, a lever on said spindle forming the fulcrum of said floating lever, and means for rotating said spindle and thereby altering the angular position of said fulcrum, a reservoir for said liquid and a connection between said reservoir and said cylinder opened and closed by said piston valve.

9. In an engine a valve, a stem secured to said valve, a piston secured to said stem, a cylinder in which said piston works, a barrel in communication with said cylinder, a plunger working in said barrel for forcing liquid under pressure into said cylinder, a second barrel and piston valve therein, a rod connected to said piston valve, and means for reciprocating said piston valve comprising a pivoted floating lever hinged to said rod and oscillated by said plunger, a spindle and bearings therefor, a lever on said spindle forming the fulcrum of said floating lever, a second lever on said spindle, a governor and means connecting said second lever with said governor for rocking said spindle and said fulcrum, a reservoir for said liquid and a connection between said reservoir and said cylinder opened and closed by said piston and valve.

10. In an engine a valve, means for opening said valve by liquid under pressure, said means comprising a cylinder, a piston slidable therein and secured to said valve, a pipe connected to said cylinder, a casing, a plunger mounted in said casing and supplying liquid under pressure to said pipe, means for reciprocating said plunger, a piston valve reciprocating in said casing, a liquid reservoir in said casing and means for varying the lead of said piston valve relatively to said plunger to connect said pipe and said reservoir at a predetermined part of the stroke of said plunger.

In testimony whereof I have signed my name to this specification.

HENRY PILLING.